No. 877,469. PATENTED JAN. 21, 1908.
W. L. PAUL.
SEEDING MACHINE.
APPLICATION FILED AUG. 27, 1907.
3 SHEETS—SHEET 1.
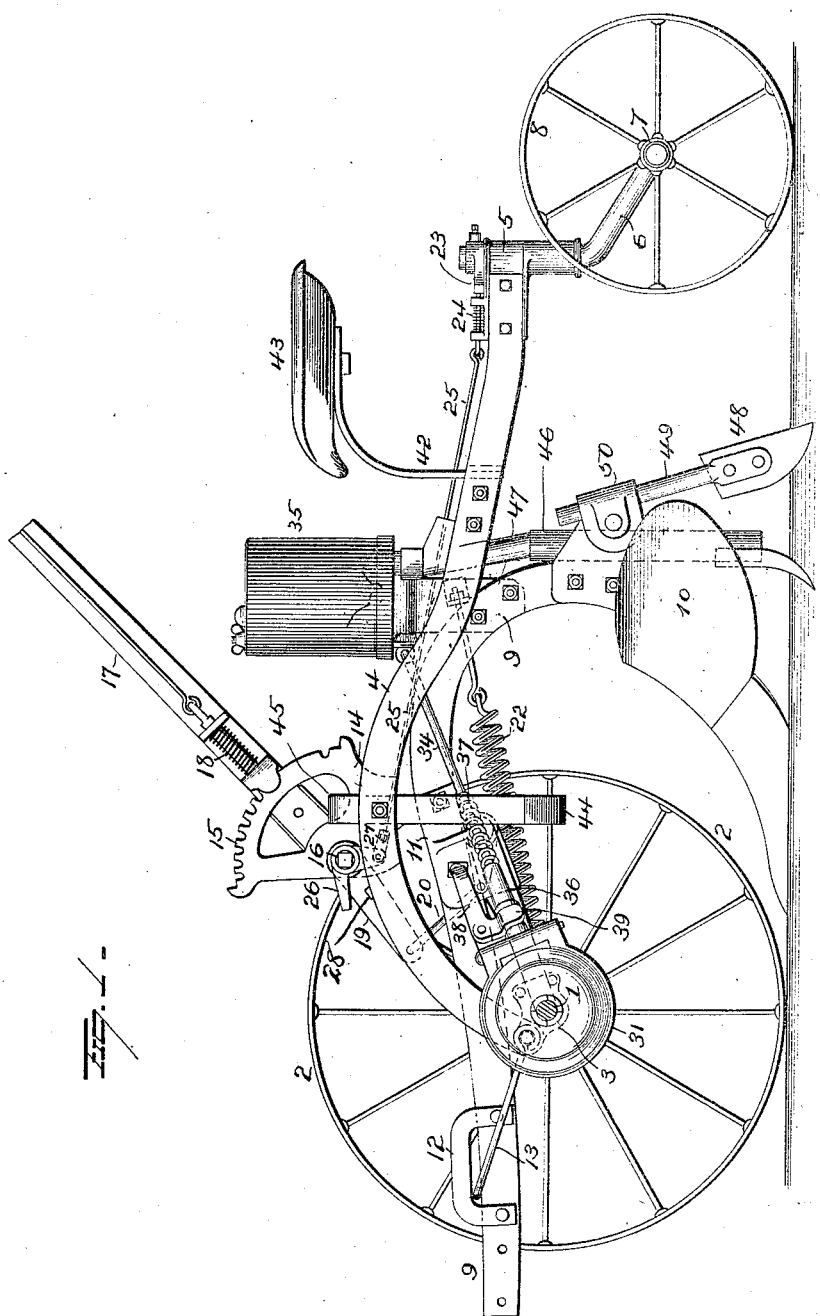
WITNESSES
E. J. Nottingham
G. F. Downing
INVENTOR
W. L. Paul
By H. A. Seymour
Attorney No. 877,469. PATENTED JAN. 21, 1908.
W. L. PAUL.
SEEDING MACHINE.
APPLICATION FILED AUG. 27, 1907.
3 SHEETS—SHEET 2.
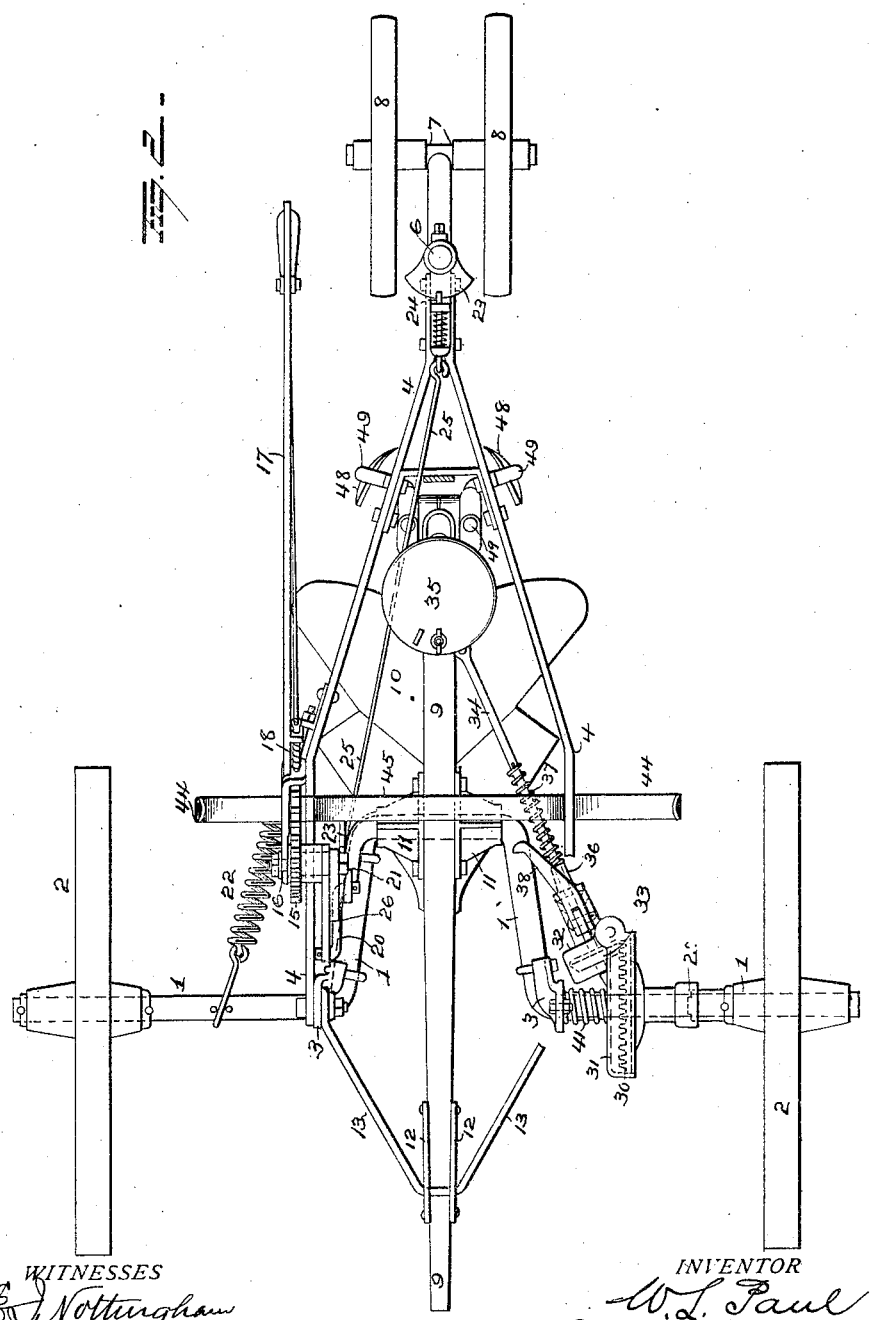
WITNESSES
INVENTOR
W. L. Paul
By H. A. Seymour
Attorney

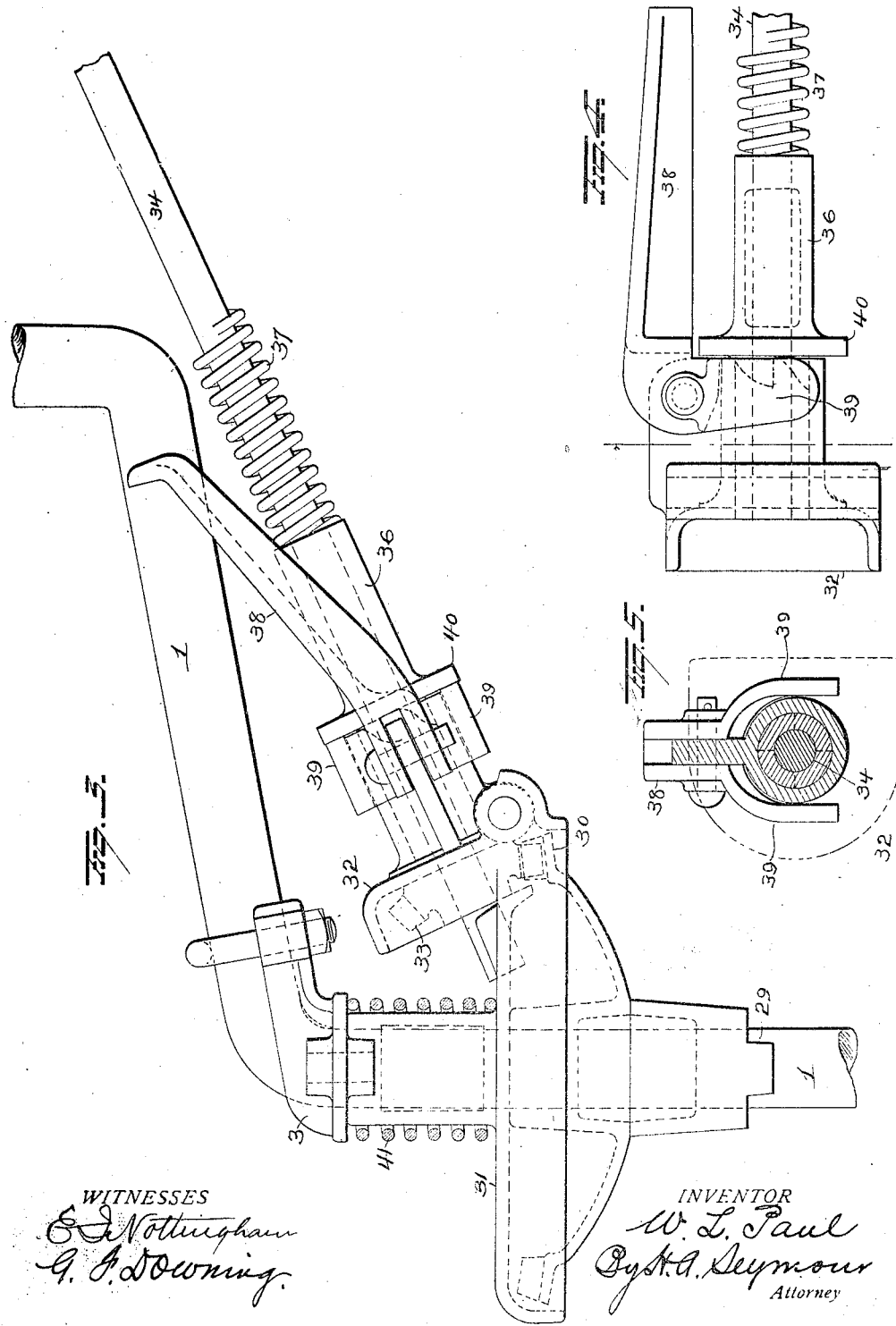

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

SEEDING-MACHINE.

No. 877,469.  Specification of Letters Patent.  Patented Jan. 21, 1908.

Original application filed May 28, 1907, Serial No. 376,096. Divided and this application filed August 27, 1907. Serial No. 390,316.

*To all whom it may concern:*

Be it known that I, WILLIAM L. PAUL, of South Bend, in the county of St. Joseph and State of Indiana, have invented certain new and useful Improvements in Seeding-Machines; and I do hereby declare the following to be a full, clear, and exact description of the invention, such as will enable others skilled in the art to which it appertains to make and use the same.

My invention relates to improvements in seeding machines this application being a division of my application for patent filed May 28th, 1907, and designated by Serial No. 376,096.

The object of my present invention is to so construct and arrange the gearing for a seeding machine or planter as to avoid possibility of accidents and prevent undue wear.

With these objects in view the invention consists in certain novel features of construction and combinations of parts as will hereinafter be described and pointed out in the claims.

In the accompanying drawings, Figure 1 is a side elevation, partly in section, of a seeding machine embodying my improvements. Fig. 2 is a plan view of the same. Figs. 3, 4 and 5 are enlarged detail views illustrating gearing for operating the feed mechanism.

1 represents an arch-axle mounted at its respective ends within the hubs of carrying-wheels 2. At the juncture of the U-shaped intermediate portion with the horizontal portions of the arch-axle, brackets 3 are attached, and to these brackets the respective members of the machine frame 4 are pivotally connected. The frame 4 is of general V-shape and at the rear meeting ends of its members a bracket 5 is secured to afford a bearing for the vertical upper portion of an axle 6, the lower portion of said axle being bent rearwardly and provided at its lower end with laterally projecting journals 7 for the accommodation of two caster or follower-wheels 8.

9 represents a plow beam having a plow 10 secured thereto and said beam has secured thereto journal boxes 11 for the accommodation of the arch-axle. The beam 9 is also provided at its forward portion with loops 12 which are bolted thereto and which receive the forward, intermediate portion of a bail 13, the rear ends of which are connected with the brackets 3 on the arch-axle. As before stated the frames of planters of the type to which my invention relates have been made to extend forward to provide a stop to hold down the front end of the beam when the plow is raised, thus necessitating the pivoting of the plow forwardly of the center of gravity. Such construction is avoided in my machine and the bail 13 is made to serve the purpose of such stop and furthermore I am enabled to shorten the machine by terminating the frame at the axle.

Bracket 14, secured to the frame 4, is provided with a toothed segment 15 and affords a bearing for the pivot pin 16 of a lever 17, said lever being provided with a latch 18 to engage the toothed-segment 15. An arm 19 is secured to the pivot pin 16 and is connected, by means of a link 20, with a bracket 21 secured to the arch-axle. It is apparent that by the operation of this lever the plow beam and the plow carried thereby can be raised and lowered. To assist in the raising of the plow a spring 22 may be employed. One end of this spring is connected with the frame 4 and the other end with the arch-axle.

The upper end of the axle 6 on which the follower wheels 8 are mounted, is provided with a notched-segment 23 and with this segment a latch 24 mounted on the frame 4, is adapted to engage to retain the follower-wheels in their normal position. A rod 25 is attached at its rear end to the latch 24 and connected at its forward end with a bell-crank lever 26 through the medium of a link 27, said bell-crank lever being attached to the pivot pin 16 of the lever 17. By means of this construction, when the lever 17 is operated to raise the plow, one arm of the bell-crank-lever 26 will be engaged by the lug 28 on the arm 19 and operate, through the medium of the rod 25 to withdraw the latch 24 and release the axle 6, thus permitting the latter to turn.

The hub of one of the carrying-wheels is connected, through the medium of a clutch 29 with a gear wheel 30 mounted on the arch-axle. A gear case 31 is provided for the gear 30 and centered on the arch-axle. To this gear case, a journal-box 32 is pivotally attached and forms a bearing for the hub of a pinion 33 which meshes with and receives motion from the gear-wheel 30. A shaft 34 is made cylindrical at its lower end and mounted in the hub of the pinion 33, the upper end of said shaft being connected with the feeding mechanism in the seed box 35. The greater portion of the shaft 34 is made angular in cross-section and has mounted thereon a clutch sleeve 36, which coöperates with the hub of the pinion 33 to lock said pinion to shaft 34 and thus cause the lattter to transmit motion to the feeding mechanism. The clutch sleeve 36 is maintained normally in operative relation to the hub of pinion 33 by means of a spring 37 located on the shaft 34 and bearing respectively, against said sleeve and a pin on the shaft. A pivotally supported shifter-lever 38 is provided with arms 39 which partially embrace the cylindrical portion of the journal box 32 so as to be located in close proximity to an annular flange or collar 40 on the clutch sleeve 36. The shifter-lever 38 is so formed that its free end will terminate in the path of movement of the arch-axle. Thus it will be seen that when the lever 17 is operated for raising the plow, the arch-axle, engaging the shifting-lever 38 will cause it to move the clutch-sleeve 36 out of operative relation to the hub or pinion 33, thus stopping the feed mechanism.

The gearing is maintained in mesh by the action of a spring 41 mounted on the arch-axle, said spring bearing at one end against the gear-case 31 and bearing at its other end against one of the brackets 3 on said arch-axle.

From the construction and arrangement of gearing, above described, it will be observed that the gear-wheel 30 is coupled to one of the carrying wheels and drives the pinion 33. While the parts thus operate, the natural thrust will tend to drive the pinion and gear apart and any misfit or wear will cause the teeth to leave the pitch line and soon become inoperative, but with my construction, the pinion 33 being housed in box 32 which is pivoted to the casing 31, will follow up the gear 30, being caused to do so by the action of the spring 41.

Supports 42 are secured to the frame 4 for the accommodation of a seat 43 and foot-rests 44 are provided at the depending ends of a yoke 45 secured to said frame.

A seed-boot 46 is suitably mounted and receives seed through a tube 47 communicating with the seed box 35. Suitable covering blades 48 are provided and the shanks 49 are connected with the plow beam 9 by means of brackets 50.

The details of construction may be varied without departing from the scope of my invention and hence I do not wish to be restricted to the precise constructive details herein set forth.

Having fully described my invention, what I claim as new and desire to secure by Letters Patent is:

1. In a seeding machine, the combination with an axle, framework and a seed receptacle provided with feeding means, of a gear wheel centered on the axle, a shaft for operating the feed mechanism, a pinion on said shaft meshing with said gear wheel, and automatic means to force the pinion to follow the gear wheel against the tendency of natural thrust to move said pinion and gear wheel apart.

2. In a seeding machine, the combination with an axle, a gear wheel centered thereon, feeding mechanism, and a shaft for driving the latter, of a pinion on said shaft meshing with said gear wheel, a member centered on the axle, a journal box for the pinion, said journal box hinged to the member on the axle, and means for forcing said member toward the gear wheel to maintain the pinion in mesh with the latter.

3. In a seeding machine, the combination with an axle, wheels thereon, framework, and a seed receptacle provided with feeding mechanism, of a gear wheel centered on the axle and driven by a carrying wheel, a journal box, a member to which said journal box is hinged, a pinion mounted in said journal box and meshing with said gear wheel, means tending to force the member to which the journal box is hinged, in a direction toward the gear-wheel, and a shaft for transmitting motion from said pinion to the feeding mechanism.

4. In a seeding machine, the combination with an axle, wheels thereon, frame-work, and a seed receptacle provided with feeding means, of a gear wheel mounted on the axle and connected with the hub of one of the carrying wheels, a journal box, a member to which said journal box is hinged, means tending to force said member outwardly toward the gear wheel, a shaft connected with said pinion for transmitting motion to the feeding means, and a clutch for operatively connecting said shaft with said pinion.

5. In a seeding machine, the combination with an axle, carrying wheels thereon, a frame, and a seed receptacle provided with feeding mechanism, of a gear wheel mounted on the axle and connected with the hub of one of the carrying wheels, a member centered on the axle, a spring tending to force said member toward the gear wheel, a journal box pivotally attached to said member, a pinion mounted in said journal box, a shaft entering the hub of the pinion and connected with the feeding mechanism, a clutch for operatively connecting said shaft with the pinion, a spring for maintaining the clutch in normal locked relation with the pinion, and a pivoted shifter-lever for releasing the clutch against the resistance of said spring.

6. In a seeding machine, the combination with an arch-axle, carrying wheels, a plow beam connected with the arch-axle, a frame, means mounted on the frame and connected with the arch-axle for raising and lowering the plow, and a seed receptacle provided with feeding mechanism, of a gear wheel mounted on the axle and connected with one of the carrying wheels, a shaft connected with the feeding mechanism, a member movable on the axle, a pinion on said shaft meshing with the gear wheel on the arch axle, a journal box for said pinion pivoted to the member movable on the axle, a clutch for locking the shaft in operative relation to the pinion, and a pivoted shifter-lever provided with means to engage the clutch and having a part terminating in the path of movement of the intermediate portion of the arch-axle, whereby when the plow is raised the seeding mechanism will be automatically thrown out of operation.

7. In a seeding machine, the combination with an axle, carrying wheels, and a seed receptacle provided with feeding means, of a gear wheel driven by a carrying wheel, a movable member adjacent to said gear wheel, a journal box pivotally attached to said movable members, a pinion carried by said journal box and meshing with said gear wheel, means for transmitting motion from said pinion to the feeding mechanism, and a spring for forcing the movable member toward the gear wheel.

In testimony whereof I have signed this specification in the presence of two subscribing witnesses.

WILLIAM L. PAUL.

Witnesses:
 FRANCIS C. NIPPOLD,
 W. A. WEED.